Figure 1:
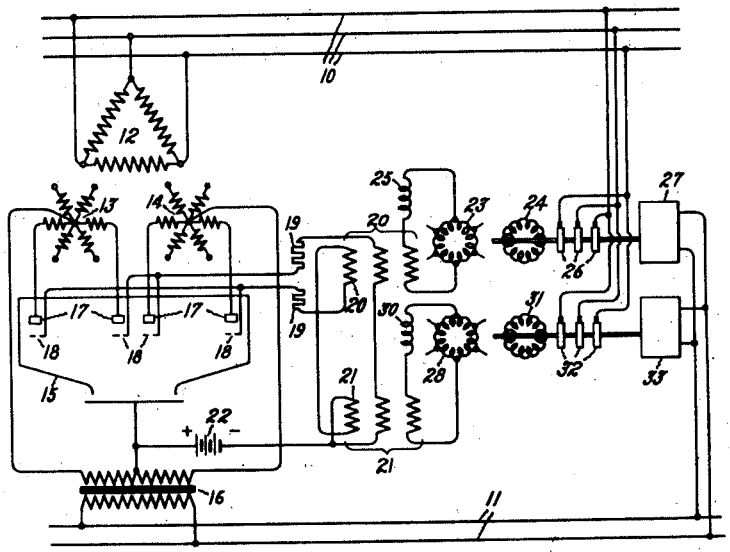

April 17, 1934.   J. A. AUGIER ET AL   1,955,524
ELECTRIC VALVE FREQUENCY CHANGING SYSTEM
Filed April 10, 1933

Inventors:
Jean A. Augier,
Pierre G. Laurent,
by *Charles E. Tullar*
Their Attorney.

Patented Apr. 17, 1934

1,955,524

UNITED STATES PATENT OFFICE 1,955,524

ELECTRIC VALVE FREQUENCY CHANGING SYSTEM

Jean Auguste Augier and Pierre Gabriel Laurent, Belfort, France, assignors to General Electric Company, a corporation of New York Application April 10, 1933, Serial No. 665,460
In France April 18, 1932

5 Claims. (Cl. 172—281)

Our invention relates to electric valve frequency changing systems and more particularly to such systems of the type in which two groups of grid-controlled electric valves supply current alternately in opposite directions, either directly into a low frequency secondary network or into the primary windings of a transformer, the secondary winding of which is connected to the low frequency network.

When electric valve converting apparatus of this type has been used to transmit energy from a relatively high frequency supply circuit to a relatively low frequency load circuit, the wave form of the alternating potential impressed upon the load circuit has generally been approximately rectangular. On the other hand, it is highly desirable that the alternating potential impressed upon the load circuit should have a substantially sinusoidal wave form to avoid the occurrence of troublesome higher harmonics which are present when the wave form departs substantially from a sinusoid.

It is an object of our invention, therefore, to provide an improved electric valve frequency changing system for transmitting energy between a relatively high frequency alternating current circuit and a relatively low frequency alternating current circuit in which the wave form of the voltage on the low frequency circuit will be substantially sinusoidal.

In accordance with one embodiment of our invention a polyphase alternating current supply circuit of a relatively high frequency is connected to supply a single phase alternating current load circuit of a relatively low frequency through an electric valve frequency changer comprising two polyphase transformer networks energized from the supply circuit and a group of grid-controlled vapor electric discharge valves associated with each of the networks and connected to supply current to oppositely connected primary windings of an output transformer. The plurality of electric valves may be combined into a single grid-controlled mercury arc rectifier or may comprise individual single cathode, single anode electric valves. The grid of each of the electric valves is excited with two alternating potentials of peaked wave form, one of a frequency equal to the sum of the frequencies of the load and supply circuits and one of a frequency equal to the difference of these frequencies.

For a better understanding of our invention, together with other and further objects thereof, reference is had to the following description taken in connection with the accompanying drawing, and its scope will be pointed out in the appended claims. In the drawing, Fig. 1 illustrates an electric valve frequency changing system embodying our invention for transmitting energy from a three-phase alternating current supply circuit to a single-phase alternating current load circuit, while Fig. 2 is a diagram representing certain operating characteristics of the arrangement of Fig. 1 to aid in the understanding of the invention.

Figure 2:
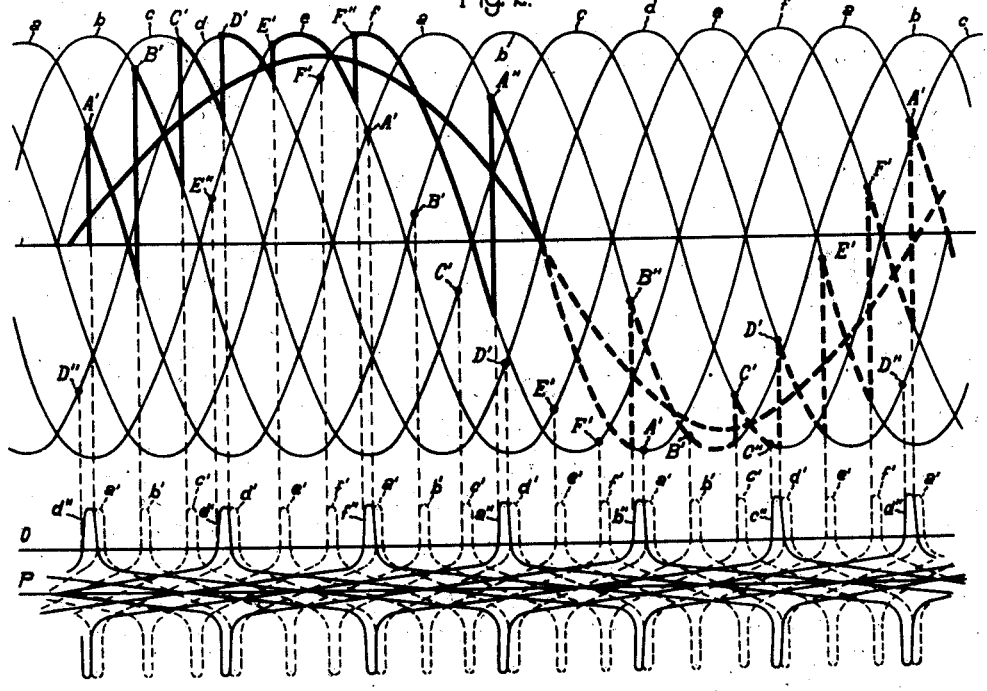

Referring now more particularly to Fig. 1 of the drawing, there is illustrated a system including a three-phase alternating current supply circuit 10 and a single-phase alternating current load circuit 11. These systems are interconnected through an electric valve frequency changing apparatus comprising a transformer consisting of a three-phase network 12 connected to the circuit 10 and a pair of six-phase secondary networks 13 and 14 cooperating with a plurality of electric valves illustrated diagrammatically as a multiple anode, single cathode, grid-controlled mercury arc rectifier 15, to supply current to oppositely connected primary windings of a transformer 16, the secondary winding of which is connected to the load circuit 11. The grid-controlled rectifier 15 is provided with twelve anodes 17 and associated control grids 18, only those connected to a single primary phase being illustrated, in order to simplify the diagram.

Each of the grids 18 is connected to the common cathode of the rectifier device 15 through a current limiting resistor 19, a secondary winding of each of grid transformers 20 and 21, and a negative bias battery 22, the grid of an anode associated with the right-hand phase winding of the networks 13 and 14 being excited with opposite polarity with respect to the grid of the anode associated with the left-hand phase winding. The primary winding of the grid transformer 20 is energized through a reactor 25 from appropriate phase terminals of the armature winding 23 of a dynamo-electric machine provided with a polyphase exciting winding 24. The winding 24 is energized from the alternating current circuit 10 through the slip rings 26 and is driven by means of a synchronous motor 27 connected to the alternating current circuit 11. Similarly, the primary winding of the grid transformer 21 is energized through a reactor 30 from the proper phase terminals of the armature winding 28 of a dynamo-electric machine provided also with a polyphase exciting winding 31 energized from the circuit 10 through the slip rings 32 and driven by means of a synchronous motor 33 energized from the alternating current circuit 11. The grid transformers 20 and 21 are preferably of the self-saturating type so that they convert the alternating potentials supplied by the armature windings 23 and 28 into alternating potentials of peaked wave form, which are particularly suitable for exciting the grids of valves of the vapor electric discharge type. It will be understood, of course, that other grid transformers similar to the transformers 20 and 21 will be provided for the grids associated with the anodes of the device 15 not illustrated and that these other transformers will be energized from appropriate phase terminals of the windings 23 and 28.

The direction of rotation of the synchronous motor 27 and the exciting winding 24 relative to the phase rotation of the magnetic field of the winding 24 is opposite to the relative rotation of the synchronous motor 33 and the phase rotation of the field of the exciting winding 31. In this manner, the frequency of the alternating potentials developed in one of the windings, for example, the winding 23, is equal to the sum of the frequencies of the supply and load circuit, while that generated in the winding 28 is equal to the difference of the frequencies of the supply and load circuits.

The general principles of operation of the above-described apparatus will be well understood by those skilled in the art. For example, if the anodes of the rectifier device 15 connected to the phase terminals of the network 13 are successively rendered conductive, this portion of the apparatus will rectify the high frequency alternating current and supply this rectified current to the left-hand portion of the primary winding of the transformer 16 for one-half cycle of the low frequency circuit while the network 14, together with its associated anodes of the rectifier device 15 will supply rectified current to the right-hand portion of the primary winding of the transformer 16 during alternate half cycles, thus producing an alternating current of low frequency in the alternating current load circuit 11.

The manner in which the above-described grid-control apparatus functions to secure this result may be best understood by reference to Fig. 2 of the drawing. In this figure, the several curves $a, b \ldots f$ represent the potentials impressed by the several phase terminals of one of the networks, for example, the network 13, upon its associated anodes. In this same figure the dotted curves $a', b', \ldots f'$ represent the alternating potentials of peaked wave form having a frequency equal to the sum of the frequencies of the supply circuit 10 and the load circuit 11 impressed upon the corresponding grids by the armature winding 23 and its associated peaking transformers. Similarly, the solid line curves $a'', b'' \ldots f''$, represent the alternating potentials of peaked wave form having a frequency equal to the difference in the frequency of the supply circuit 10 and the load circuit 11 supplied by the winding 28 through its associated peaking transformers. In this figure, also, the line P represents the negative bias supplied by the battery 22 while the line O represents the critical grid potential of the several valve paths, which may be assumed to be approximately zero. With such an arrangement, it is possible for a given anode to conduct current, for example, the anode whose potential is represented by the curve $a$, each time its grid receives a positive impulse from the curve $a'$ or $a''$, with the further condition that the potential of the anode $a$ at the particular instant at which it receives these impulses is more positive than the anode already conducting current.

Under the conditions represented in the curves, the anode whose potential is represented by the curve $a$ first becomes conductive at the point A' when the grid associated with this anode receives the positive impulse $a'$. Similarly, the anode represented by the curve $b$ becomes conductive at the instant B' when its associated grid receives a positive impulse $b'$, and the anodes $c, d$, and $e$ become conductive at the instants C', D' and E', respectively. Due to the fact that the positive impulses $a', b'$, etc., occur at a frequency equal to the sum of the frequencies of the supply circuit and the load circuit, it is seen that there is a progressive phase advance of the point in the cycle of anode potential at which an anode becomes conductive, so that the average value of the voltage impressed upon the left-hand portion of the primary winding of the transformer 16, represented by the heavy zigzag curve, gradually increases in amplitude in accordance with the increase of the normal sinusoidal voltage wave of low frequency represented in Fig. 2 by the solid smooth line sinusoid. It will be noted that at the point E'' a positive impulse is given to the grid associated with the anode $e$, but at this point the potential of the anode $e$ is less positive than that of the anode $c$ which is already conducting, so that this impulse is of no effect. Similarly, at the point F' the grid associated with the anode $f$ receives a positive impulse $f'$ but this anode is at a lower potential than the anode $e$ already conducting so that the impulse on the grid is ineffective. At the point F'', however, the grid associated with the anode $f$ receives a second impulse from the curve $f''$ and this anode becomes conducting. Similarly, at the second occurrence of points A', B', C', etc., the potentials of the corresponding anodes are less than the then conducting anodes so that these anodes do not become conductive. An inspection of the diagram of Fig. 2, indicates that during the rising portions of the half cycle of low frequency voltage, only those impulses impressed upon the grids from the curves $a', b', \ldots f'$, that is, those potentials of a frequency equal to the sum of the frequencies of the supply and load circuits, are effective to successively render the several anodes conductive, while during the descending portion of the low frequency sine wave the points F'' A'', etc., are determined by impulses impressed upon the grids corresponding to the curves $a'', b'', \ldots f''$, the frequency of which is the difference between the frequency of the supply circuit and the load circuit.

The heavy dotted line portion of the curve represents conditions when the current is flowing in opposition to the electromotive force of the networks 13 and 14. This condition also prevails during the initial portion of the dotted half cycle when a lagging current is being drawn by the load circuit 11 and during the final portion of the dotted half cycle when a leading current is being drawn by the load circuit. During these portions of the cycle the power flow is negative. Thus it can readily be seen that power can be transmitted in an opposite direction if the relative voltage of the load circuit is higher than that of the supply circuit, in which case the heavy dotted line portion of the curve will represent the obtaining voltage conditions on the anodes of the several electric valves of the device 15. Thus, by exciting the grids of the several valves with two alternating potentials of peaked wave form, one of a frequency equal to the sum of the supply and load frequencies and one equal to the difference of these frequencies, there is produced on the low frequency circuit a substantially sinusoidal voltage and current which have no other harmonics than those corresponding to the number of the anodes of the frequency changer, which, because of their high frequency, may be economically filtered from the load circuit.

While we have described what we at present consider the preferred embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. An electric valve frequency changing system comprising an alternating current supply circuit, an alternating current load circuit, a converting apparatus including a plurality of grid controlled vapor electric valves interconnecting said circuits to transmit energy therebetween, and means for exciting the grids of said valves with periodic potentials of peaked wave form, said potentials including a component of a frequency equal to the sum of the frequencies of said supply and load circuits and a component of a frequency equal to the difference of said frequencies.

2. An electric valve frequency changing system comprising an alternating current supply circuit, an alternating current load circuit, a converting apparatus including a plurality of grid controlled vapor electric valves interconnecting said circuits to transmit energy therebetween, and a grid circuit for each of said valves including a source of alternating potential of peaked wave form of a frequency equal to the sum of the frequencies of said load circuit and said supply circuits and a source of alternating potential of a frequency equal to the difference of said frequencies.

3. An electric valve frequency changing system comprising an alternating current supply circuit, an alternating current load circuit, a converting apparatus including a plurality of grid controlled vapor electric valves interconnecting said circuits to transmit energy therebetween, a pair of auxiliary dynamo-electric machines, each provided with an induced winding and an inducing winding, said windings being driven relative to each other at the synchronous speed of one of said circuits and said inducing winding being excited from the other of said circuits, the mechanical rotation of the windings of said machines relative to the phase rotation of their inducing windings being in opposite directions, a grid circuit for each of said valves including a potential derived from each of said induced windings, and means for converting the potentials derived from said machines into alternating potentials of peaked wave form.

4. An electric valve frequency changing system comprising an alternating current supply circuit, an alternating current load circuit, a converting apparatus including a plurality of grid controlled vapor electric valves interconnecting said circuits to transmit energy therebetween, a pair of auxiliary dynamo-electric machines, each provided with a stationary armature winding and a rotating field winding energized from said supply circuit, a pair of synchronous motors energized from said load circuit and connected to drive said field windings in opposite directions, a grid circuit for each of said valves including a pair of self-saturating transformers, each energized from one of said armature windings.

5. An electric valve frequency changing system comprising a polyphase alternating current supply circuit, an alternating current load circuit, a converting apparatus interconnecting said circuits and including a pair of polyphase inductive networks energized from said supply circuit and a group of grid controlled vapor electric valves associated with each of said networks, said networks and valves being oppositely connected with respect to said load circuit, and means for approximating a sinusoidal voltage wave on said load circuit comprising means for exciting the grids of said valves with periodic potentials of peaked wave form, said potentials including a component of a frequency equal to the sum of the frequencies of said supply and load circuits and a component of a frequency equal to the difference of said frequencies, and the grid excitation of the valves associated with one of said networks being in phase opposition to that of the valves associated with the other network.

JEAN AUGUSTE AUGIER.
PIERRE GABRIEL LAURENT.